US011265040B2

United States Patent
Martone et al.

(10) Patent No.: US 11,265,040 B2
(45) Date of Patent: Mar. 1, 2022

(54) METHOD AND SYSTEM FOR OPTIMIZING TRANSCEIVER SPECTRUM SHARING

(71) Applicant: CCDC Army Research Laboratory, Adelphi, MD (US)

(72) Inventors: Anthony F. Martone, Ellicott City, MD (US); Kyle A. Gallagher, Silver Spring, MD (US); Kelly D. Sherbondy, Burke, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 16/668,627

(22) Filed: Oct. 30, 2019

(65) Prior Publication Data
US 2021/0135703 A1    May 6, 2021

(51) Int. Cl.
*H04W 16/14* (2009.01)
*H04B 1/7113* (2011.01)
*G06N 3/12* (2006.01)
*H04W 52/24* (2009.01)
*G01S 7/40* (2006.01)

(52) U.S. Cl.
CPC ......... *H04B 1/7113* (2013.01); *G01S 7/4008* (2013.01); *G06N 3/126* (2013.01); *H04W 16/14* (2013.01); *H04W 52/242* (2013.01); *G01S 7/4013* (2021.05)

(58) Field of Classification Search
None
See application file for complete search history.

(56) References Cited

U.S. PATENT DOCUMENTS

| | | | |
|---|---|---|---|
| 9,635,508 B2 | 4/2017 | Martone et al. | |
| 10,101,436 B2 | 10/2018 | Martone et al. | |
| 2011/0084871 A1 | 4/2011 | Haykin et al. | |
| 2015/0296386 A1* | 10/2015 | Menon | H04W 16/18 370/241.1 |
| 2017/0026847 A1* | 1/2017 | Farshchian | H04W 16/14 |
| 2017/0135106 A1* | 5/2017 | Li | H04W 24/08 |
| 2017/0195887 A1* | 7/2017 | Jovancevic | H04W 72/0446 |
| 2017/0295497 A1* | 10/2017 | MacMullan | H04W 16/14 |
| 2017/0332243 A1* | 11/2017 | MacMullan | H04B 17/318 |
| 2018/0217230 A1 | 8/2018 | Martone et al. | |

(Continued)

OTHER PUBLICATIONS

Muhammad Rashid Ramzan, Nadia Nawaz, Ashfaq Ahmed Muhammad Naeem, Muhammad Iqbal, Alagan Anpalagan, Multi-objective optimization for spectrum sharing in cognitive radio networks: A review, Pervasive and Mobile Computing 41 (2017), pp. 106-131, (Year: 2017).*

(Continued)

*Primary Examiner* — German Viana Di Prisco
(74) *Attorney, Agent, or Firm* — Eric B. Compton

(57) ABSTRACT

A method and system for providing a cooperative spectrum sharing model that jointly optimizes primary user equipment parameters for improved frequency agility and performance while mitigating mutual interference between the primary user equipment and secondary user equipment. Spectrum sensing is implemented to form a power spectral estimate of the electromagnetic environment (EME) and apply multi-objective optimization to adjust the operational parameters of the primary user equipment to mitigate interference.

23 Claims, 3 Drawing Sheets

(56) References Cited

U.S. PATENT DOCUMENTS

2018/0242165 A1* 8/2018 MacMullan ........ H04W 72/048
2020/0053569 A1* 2/2020 Hannan ................ H04W 16/14

OTHER PUBLICATIONS

G. Kalaichelvi, Dhananjay Kumar, Aarti Mandal, A. Karthikeyan, GA based Dynamic Spectrum Allocation in UHFISM Band of 902-928MHz with RADAR as Primary User for Cognitive Radio, 2013 International Conference on Recent Trends in Information Technology (Year: 2013).*
F.H. Sanders et al., "Analysis of electromagnetic compatibility between radar stations and 4 GHz fixed-satellite earth stations", U.S. Department of Commerce, National Telecommunications and Information Administration (NTIA), Wash. D.C., NTIA Report 94-313, Jul. 1994.
K. Deb et al., "Simulated binary crossover for continuous search space", Complex Systems, vol. 9, pp. 115-148, Apr. 1995.
J. Mitola et al., "Cognitive Radio: Making Software Radios More Personal", IEEE Personal Communications, 6, 4, Aug. 1999, pp. 13-18.
K. Deb et al., "A fast and elitist multiobjective genetic algorithm: NSGA-II", IEEE Transactions on Evolutionary Computation, vol. 6, No. 2, pp. 182-197, Apr. 2002.
Federal Communication Commission, "Unlicensed operation in the TV broadcast bands", Wash. D.C., FCC 04-113, May 2004.
S. Haykin, "Cognitive Radar: a Way of the Future", IEEE Signal Processing Magazine, vol. 23, 1, Jan. 2006, pp. 30-40.
Q. Zhao et al., "A survey of dynamic spectrum access," IEEE Signal Processing Magazine, vol. 24, No. 3, pp. 79-89, May 2007.
S. Haykin et al., "Optimal Waveform Design for Cognitive Radar", Proceedings of the 2008 Asilomar Conference on Signals, Systems and Computers, Oct. 2008, pp. 3-7.
J.M. Peha, "Sharing spectrum through spectrum policy reform and cognitive radio", Proc. IEEE, vol. 97, No. 4, pp. 708-719, Apr. 2009.
E. Drocella et al., "Description of a model to compute the aggregate interference from radio local area networks employing dynamic frequency selection to radars operating in the 5 GHz frequency range", U.S. Department of Commerce, National Telecommunications and Information Administration (NTIA), Wash. D.C., NTIA Memo 09-461, May 2009.
R. Saruthirathanaworakun et al., "Opportunistic primary-secondary spectrum sharing with a rotating radar," Intl. Conf. Computing, Networking and Communications, Maui, HI, pp. 1025-1030, Jan./Feb. 2012.
F.H. Sanders et al., "Analysis and resolution of RF interference to radars operating in the band 2700-2900 MHz from broadband communication transmitters", U.S. Department of Commerce, National Telecommunications and Information Administration (NTIA), Wash. D.C., NTIA Report 13-490, Oct. 2012.
R. Blank et al., "Evaluation of the 5350-5470 MHz and 5850-5925 MHz bands pursuant to section 6406(b) of the middle class tax relief and job creation act of 2012", U.S. Department of Commerce, National Telecommunications and Information Administration (NTIA), Wash. D.C., Jan. 2013.
C. S. Sum, et al., "Cognitive communication in TV white spaces: An overview of regulations, standards, and technology", IEEE Communications Magazine, vol. 51, No. 7, pp. 138-145, Jul. 2013.
A. Khawar et al., "Spectrum sharing between S-band radar and LTE cellular system: A spatial approach", IEEE Intl. Symp. Dynamic Spectrum Access Networks, Mclean, VA, pp. 1-4. Apr. 2014.
F.H. Sanders et al., "Effects of radar interference on LTE base station receiver performance", U.S. Department of Commerce, National Telecommunications and Information Administration (NTIA), Wash. D.C.. NTIA Report 14-499, May 2014.
A.F. Martone et al., "Fast technique for wideband spectrum sensing", in IEEE Intl. Symp. on Antennas and Propagation, Memphis, Tennessee, Jul. 2014.
F.H. Sanders et al., "EMC measurements for spectrum sharing between LTE signals and radar receivers", U.S. Department of Commerce, National Telecommunications and Information Administration (NTIA), Wash. D.C., NTIA Report 14-507, Jul. 2014.
F.H. Sanders et al., "Effects of radar interference on LTE (FDD) eNodeB and UE receiver performance in the 3.5 GHz band", U.S. Department of Commerce, National Telecommunications and Information Administration (NTIA), Wash. D.C., NTIA Report 14-506, Jul. 2014.
A. F. Martone, "Cognitive radar demystified", URSI Radio Science Bulletin, vol. 2014, No. 350, pp. 10-22, Sep. 2014.
J. R. Guerci et al., "RAST: Radar as a subscriber technology for wireless spectrum cohabitation", 2014 IEEE Radar Conference, Cincinnati, OH, 2014, pp. 1130-1134.
A.F. Martone et al., "Passive sensing for adaptable radar bandwidth", IEEE Intl. Radar Conf., Arlington, Va, May 2015.
H. Wang et al., "On spectrum sharing between communications and air traffic control radar systems", IEEE Intl. Radar Conf., Arlington, VA, pp. 1545-1550, May 2015.
A.F. Martone et al., "Adaptable bandwidth for harmonic step-frequency radar", International Journal of Antennas and Propagation, Article ID 808093, Jul. 2015.
J.G. Metcalf et al., "Analysis of symbol design strategies for intrapulse radar-embedded communications", IEEE Trans. Aerospace & Electronic Systems, vol. 51, No. 4, pp. 2914-2931, Oct. 2015.
J. Jakabosky et al., "Incorporating hopped spectral gaps into nonrecurrent nonlinear FMCW radar emission", in Proceedings of the IEEE International Workshop Computational Advances in Multi-Sensor Adaptive Processing, Cancun, Mexico, pp. 281-284, Dec. 2015.
P. Stinco et al., "Spectrum sensing and sharing for cognitive radars", IET Radar, Sonar & Navigation, vol. 10, No. 3, pp. 595-602, Feb. 2016.
A.F. Martone et al., "Genetic algorithm for adaptable radar bandwidth", IEEE Radar Conf., Philadelphia, PA, May 2016.
J. Jakabosky et al., "Gapped spectrum shaping for tandem-hopped radar/communications & cognitive sensing", in Proceedings of the 2016 IEEE Radar Conference, Philadelphia, PA, May 2016.
F. Hessar et al., "Spectrum sharing between a surveillance radar and secondary Wi-Fi networks", IEEE Transactions on Aerospace and Electronic Systems, vol. 52, No. 3, pp. 1434-1448, Jun. 2016.
J. H. Reed et al., "On the Co-Existence of TD-LTE and Radar Over 3.5 GHz Band: An Experimental Study", in IEEE Wireless Communications Letters, vol. 5, No. 4, pp. 368-371, Aug. 2016.
A. Martone et al., "Tuning technology for adaptable radar bandwidth", 2016 IEEE MTT-S Int. Microwave Symp. (IMS), San Francisco, CA, 2016, pp. 1-3.
A. R. Chiriyath et al., "Radar-Communications Convergence: Coexistence, Cooperation, and Co-Design", in IEEE Transactions on Cognitive Communications and Networking, vol. 3, No. 1, pp. 1-12, Mar. 2017.
J.A. Kovarskiy et al., "Comparison of RF spectrum prediction methods for dynamic spectrum access", in Proceedings of SPIE Radar Sensor Technology XXI, Anaheim, CA, Apr. 2017.
M. Labib et al., "Coexistence between communications and radar systems: A survey", in URSI Radio Science Bulletin, vol. 2017, No. 362, pp. 74-82, Sep. 2017.
A. Martone et al., "Adaptable waveform design for enhanced detection of moving targets", IET Radar, Sonar & Navigation, vol. 11, No. 10, pp. 1567-1573, Oct. 2017.
B. Ravenscroft et al., "Analysis of spectral notching in FM noise radar using measured interference", in Proceedings of the 2017 IET International Radar Conference, Belfast, UK, Oct. 2017.
C. Sahin et al., "Characterization of range sidelobe modulation arising from radar-embedded communications", International Conference on Radar Systems (Radar 2017), Belfast, 2017, pp. 1-6.
P. M. McCormick et al., "Simultaneous radar and communications emissions from a common aperture, Part I: Theory", 2017 IEEE Radar Conference (RadarConf), Seattle, WA, 2017, pp. 1685-1690.

(56) References Cited

OTHER PUBLICATIONS

P. Karunakaran et al., "Sensing Algorithms and Protocol for Simultaneous Sensing and Reception-Based Cognitive D2D Communications in LTE-A Systems", in IEEE Transactions on Cognitive Communications and Networking, vol. 4, No. 1, pp. 93-107, Mar. 2018.

J.A. Kovarskiy et al., "Predictive energy detection for inferring radio frequency Activity", in Proceedings of SPIE Radar Sensor Technology XXII, Orlando, FL, Apr. 2018.

E. Selvi et al., "On the use of Markov decision processes in cognitive radar: an application to target tracking", in Proceedings of the 2018 IEEE Radar Conference, Oklahoma City, OK, May 2018.

J.W. Owen et al., "Experimental demonstration of cognitive spectrum sensing & notching for radar", in Proceedings of the 2018 IEEE Radar Conference, Oklahoma City, OK, May 2018.

B.H. Kirk et al., "Cognitive software defined radar for time-varying RFI avoidance", in Proceedings of the 2018 IEEE Radar Conference, Oklahoma City, OK, May 2018.

A. Herschfelt et al., "Spectrum management and advanced receiver techniques (SMART): Joint radar-communications network performance", 2018 IEEE Radar Conference (RadarConf18), Oklahoma City, OK, 2018, pp. 1078-1083.

A. Martone et al., "Spectrum allocation for non-cooperative radar coexistence", IEEE Trans. Aerospace & Electronic Systems, 54 (1), 90-105, Feb. 2018.

J.H. Reed, A.W. Clegg, A.V. Padaki, T. Yang, R. Nealy, C. Dietrich, C.R. Anderson, D.M. Mearns, "On the Co-Existence of TD-LTE and Radar Over 3.5 GHz Band: An Experimental Study," *IEEE Wireless Communications Letters*, vol. 5, No. 4, pp. 368-371, Aug. 2016.

S.S. Bhat, R.M. Narayanan, and M. Rangaswamy, "Bandwidth sharing and scan scheduling in multimodal radar with communications and tracking," *IETE Journal of Research*, vol. 59, No. 5, pp. 551-562, Sep. 2013.

A. F. Martone, K. A. Gallagher and K. D. Sherbondy, "Joint Radar and Communication System Optimization for Spectrum Sharing," *2019 IEEE Radar Conference (RadarConf)*, Boston, MA, USA, 2019, pp. 1-6.

\* cited by examiner

Spectrum Sensing System 110

METHOD AND SYSTEM FOR OPTIMIZING TRANSCEIVER SPECTRUM SHARING

GOVERNMENT INTEREST

The invention described herein may be manufactured, used and licensed by or for the U.S. Government.

BACKGROUND

Field

Embodiments of the present invention generally relate to transceiver spectrum sharing and, more particularly, to a method and system for optimizing transceiver spectrum sharing.

Description of the Related Art

Assured spectrum access is a growing challenge for all sorts of transceivers, including both incumbent radars and communication systems. These challenges will continue to grow as mobile data traffic increases and requires the need for more bandwidth. One example of this spectrum access paradigm in the United Sates is the Citizens Broadband Radio Service (CBRS) at 3.5 GHz, which promotes spectrum sharing between Long-Term Evolution (LTE) (a so-called "secondary user") and radar (a so-called "primary user"). Another example considers the Federal Communications Commission (FCC) auction of the advanced wireless service 3 (AWS-3) bands. In most circumstances, the incumbent users of the AWS-3 bands must either vacate the band or share the band with the new licensed users. Other frequency bands are being considered for auction that could have a tremendous impact on government radar systems, which are typically the incumbent or primary user. Ideally future radars will have the capability to coexist with secondary (or lower priority) RF users and with communication systems that have equal rights to the band while maintaining high-performance requirements of both primary and secondary user equipment.

Solutions to these spectrum challenges include cognitive radar for spectrum sharing. Spectrum sharing approaches are grouped into categories of coexistence and cooperation. Coexistence approaches monitor the spectrum to mitigate mutual interference. The classic coexistence example is cognitive radio for dynamic spectrum access (DSA). The cognitive radio implements spectrum sensing to monitor the spectrum for primary user activity. The underutilized spectrum is then dynamically accessed when the primary user is inactive (temporal spectrum access). Other coexistence approaches implement a sense-and-avoid strategy, which changes the operational frequency of the radar to avoid RF emitters in the spectrum. An example of this approach is the spectrum sensing, multi-objective optimization (SSMO) technique. SSMO maximizes multiple objective functions to identify the optimal frequency allocation based on spectrum sensing information and has been shown to maximize radar performance while mitigating mutual interference.

Cooperative approaches consider a co-design strategy between the radar and communication system that follow a common protocol. Some approaches combine the functionality of radar and radio into one "radar-communications node," which maximizes joint performance. Other approaches consider radar protection zones with power allocation for in-band operation of the radar and communication system. These approaches examine the harmful interference between systems, the minimum distance (or power level) to mitigate harmful interference and apply methods to attenuate communication system power to prevent mutual interference.

Currently available coexistence and cooperative techniques do not optimally mitigate the interference between primary and secondary user equipment. Therefore, there is a need in the art for a comprehensive system to optimize spectrum sharing among transceivers, especially among radars and communications systems.

SUMMARY

Embodiments of the invention include a cooperative spectrum sharing model that jointly optimizes multiple radar and communication system parameters for improved frequency agility and performance while mitigating mutual interference between secondary radio-frequency (RF) users. Spectrum sensing is implemented to form a power spectral estimate of the electromagnetic environment (EME) to identify secondary user equipment. Multi-objective optimization then adjusts the output power, center frequency, and bandwidth parameters of the primary user equipment to maximize range resolution, signal to interference plus noise ratio (SINR), and channel capacity.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention include a method and system for optimizing spectrum sharing among transceivers. In one embodiment, the system comprises a spectrum sensing system that is coupled to certain controllable transceivers (primary user equipment) such as communications systems and radar systems. The spectrum sensing system monitors a relevant spectrum for background interference, secondary user equipment transmissions, and primary user equipment transmissions. An optimization method analyses the spectrum and adapts the utilization of the spectrum by the primary user equipment to optimize sharing of the spectrum with the secondary users.

Figure 1:
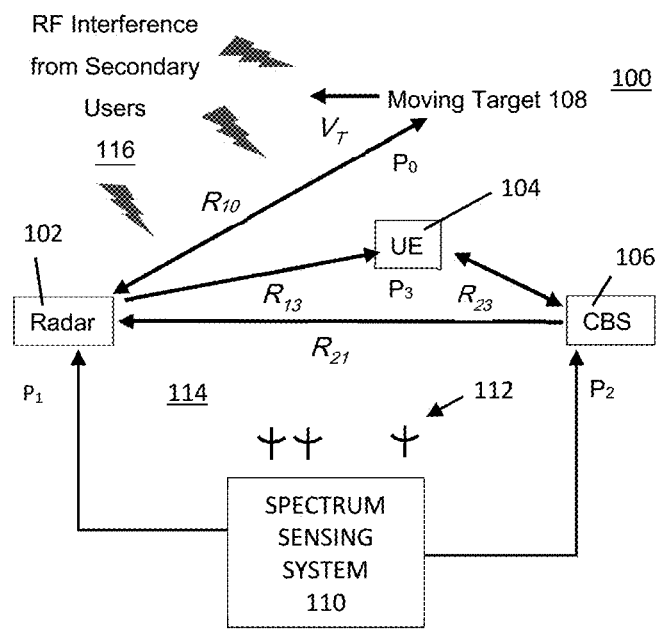
FIG. 1 depicts a scenario for co-operative spectrum sharing between primary user equipment and secondary user equipment.

The spectrum sharing scenario 100, illustrated in FIG. 1, depicts a tracking radar 102 operating within the same vicinity of a communications base station (CBS) 106 and user equipment (UE) 104. The radar 102 is ground-based and tracks a generic airborne moving target 108. Embodiments of the invention is modifiable to support different communication system types (LTE, Global System for Mobile (GSM) communication, 5G, etc). Together the radar 102 and communication base station 106 represent primary user equipment 114 with equal rights to the spectrum and can coordinate their spectrum access to maximize performance. The UE 104 represent secondary user equipment 116 that must be permitted to share the spectrum of the primary user equipment 114.

The radar 102 and target 108 are located at positions $P_1$ and $P_0$, respectively, separated by a distance of $R_{10}$. The CBS 106 and UE 104 are located at positions $P_2$ and $P_3$, respectively, separated by a distance of $R_{23}$. $R_{13}$ indicates the distance between the radar 102 and the UE 104, while $R_{21}$ indicates the distance between the radar 102 and the CBS 106. In this scenario, the capacity of the downlink channel is examined, and the UE 104 is positioned at the minimal separation distance to the radar 102 (close as possible), denoted as $R_{13}$, within the main beam of the radar 102. This distance represents the maximum interference possible from the radar 102 to the UE 104, i.e., the worst-case scenario.

The scenario 100 of FIG. 1 also illustrates RF interference from secondary user equipment 116, where these emitters are considered secondary users whose goal is to access underutilized spectrum. Interference from the primary users to the secondary users is therefore allowed, but interference from the secondary users to the primary users should be mitigated. However, given the need for co-existence, the primary users should limit their spectrum access and mitigate mutual interference, if possible. For example, it is possible for the radar to reduce its bandwidth in order to operate in a channel with high SINR when no target is present. Spectrum sharing is therefore established between the primary and secondary user equipment 114 and 116. Then, after a target 108 is detected, the radar 102 can trade-off SINR for more bandwidth (as the target becomes closer to the radar) to maximize its range resolution while maintaining target detection.

Figure 2:
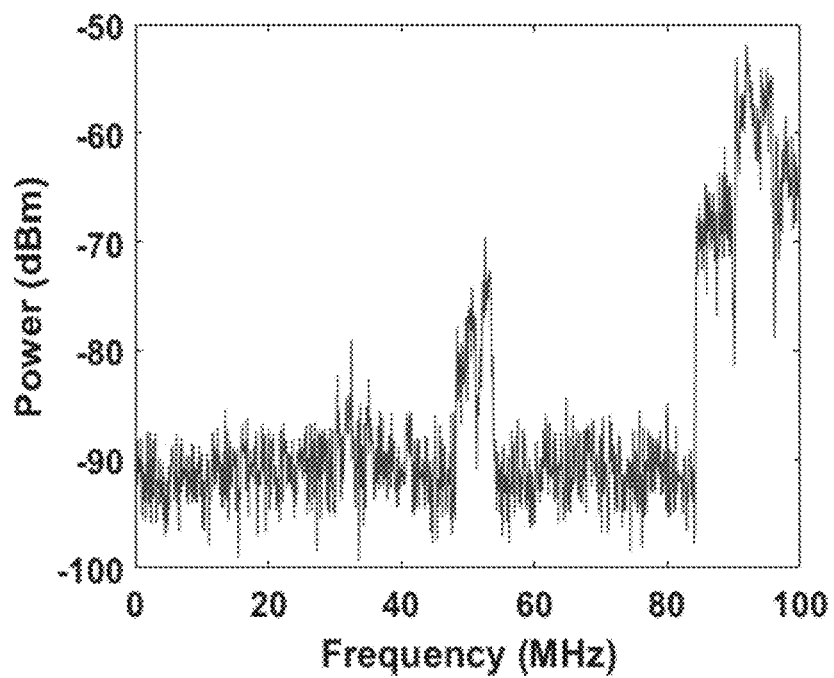
FIG. 2 depicts an exemplary power spectrum of spectral activity in an exemplary scenario as depicted in FIG. 1.

A spectrum sensing system 110 shown in FIG. 1 generates knowledge of the secondary user activity. Specifically, the spectrum sensing system 110 uses one or more antennas 112 to passively sense the electromagnetic environment (EME). The system 110 estimates a power spectrum of the EME that is defined as $\Theta=\{\theta_1, \ldots, \theta_N\}$ of size N for the baseband frequencies $F=\{f_1, \ldots, f_N\}$ with bandwidth B and frequency resolution $\Delta_B$, where $\theta_n$ is the $n^{th}$ frequency domain sample. For example, consider the spectrum in FIG. 2 that is used here for illustration purposes. This spectrum was recorded with B=100 MHz and $\Delta_B$=100 kHz. The spectrum sensing system analyzes the spectrum by implementing multi-objective optimization (MO) to determine "the best" channel, or sub-band, for radar and communication system dynamic spectrum access (DSA). Note that it is possible for radar or the communication system to occupy more bandwidth and radiate within the same band of the secondary users. It is also possible for radar and the communication system to occupy the same sub-band with a reduced transmit power. The consequence for either of these solutions results in mutual interference that reduces the SINR of all systems. Analysis of the spectrum is therefore necessary to determine the optimal trade-off solution. The optimal sub-band information is then transferred to the radar and the CBS such that the transceiver parameters are adjusted to optimize interference mitigation. The optimal sub-band information is sent to the radar and CBS via wired or wireless communications. In this manner, the spectrum sensing system, in effect, controls the operational parameters of the primary user equipment.

The SS-MO solution is found using a multiobjective genetic algorithm as, for example, described in A. Konak, D. Coitb, and A. Smith, "Multi-Objective Optimization Using Genetic Algorithms: A Tutorial," Reliability, Engineering, and System Safety, vol. 91, no. 9, pp. 992-1007, September 2006, hereby incorporated by reference in its entirety. There are many genetic algorithms that may find use in various embodiments of the invention including, but not limited to: Multi-objective Genetic Algorithm (MOGA), Niched Pareto Genetic Algorithm (NPGA), Weight-based Genetic Algorithm (WBGA), Random Weighted Genetic Algorithm (RWGA), Nondominated Sorting Genetic Algorithm (NSGA), Strength Pareto Evolutionary Algorithm (SPEA), improved SPEA (SPEA2), Pareto-Archived Evolution Strategy (PAES), Pareto Envelope-based Selection Algorithm (PESA), Region-based Selection in Evolutionary Multiobjective Optimization (PESA-II), Fast Nondominated Sorting Genetic Algorithm (NSGA-II), Multi-objective Evolutionary Algorithm (MEA), Micro-GA, Rank-Density Based Genetic Algorithm (RDGA), and Dynamic Multi-objective Evolutionary Algorithm (DMOEA).

One specific example of a genetic algorithm is the NSGA-II technique described in K. Deb, A. Pratap, S. Agarwal, T. Meyarivan, "A fast and elitist multiobjective genetic algorithm: NSGA-II," *IEEE Transactions on Evolutionary Computation*, vol. 6, no. 2, pp. 182-197, April 2002, hereby incorporated by reference in its entirety. NSGA-II sorts a population of individuals, where each individual represents a decision variable with a corresponding solution. The solution for each individual is found using objective functions. After an initial parent population is randomly generated, NSGA-II implements: 1) crossover and mutation; 2) a formation of an elite population; and 3) a population sort and rank procedure. Each iteration of this procedure produces the next generation of samples, i.e., the children, within the population. Simulated binary crossover (SBX) is used for the crossover procedure with parameter $\eta_c$. A large $\eta_c$ produces children very similar to the parents, where a small $\eta_c$ produces dissimilar children. Polynomial mutation is used for the mutation process with parameter $\eta_m$, a variable that controls the similarity between the original and mutated individual (with properties similar to $\eta_c$). An elite population of M individuals is then formed by combining the parent and child generations, which is then sorted and ranked using the non-dominated procedure. The goal of the genetic algorithm is to evolve this population over T generations such that the decision variables converge to the optimal solution.

The decision variable vector is defined as $x=\{x_1, x_2, x_3, x_4, x_5, x_6\}$. The variable $x_1=P_1$ is the radar transmitter power, where $0 \leq P_1 \leq P_{1,max}$ and $P_{1,max}$ is the max available power. The radar bandwidth is defined as $x_2=\beta_1(i)=\Delta_B$, where $i \in \{1, \ldots N\}$. Note that $\beta_1(i)=B$, the full bandwidth solution, when i=N and $\beta_1(i)=\Delta B$, the frequency resolution, when i=1. $x_3=\delta_1(j)=f_j \in F$ is the lower, or start, frequency of the linear frequency modulated (LFM) waveform, where $j \in \{1, \ldots N\}$. The lower frequency is used in this development, as opposed to the center frequency $\delta_1(j)+\delta_1(j)/2$, to make the mathematical development more convenient. Note that $\beta_1(i)+\delta_1(j) \leq B$, i.e., the operational band of the radar cannot exceed the upper limit of the baseband. The CBS transmitter power is defined as $x_4=P_2$, where $0 \leq P_2 \leq P_{2,max}$ and $P_{2,max}$ is the max available power. $x_5=\beta_2(k)$ is the CBS and UE bandwidth of operation, where $k \in \{1, \ldots K\}$. The variable $x_6=\delta_2(l)=f_l \in F$ is the lower frequency of the CBS and UE bandwidth of operation, where $l \in \{1, \ldots N\}$.

The radar SINR objective function is defined as $$Z_1 = P_1 G_1^2 \lambda^2 \sigma N_P \tau \beta_1(i) / [L_1(4\pi)^3 R_{10}^4 (l_{21}(P_2,i,j,k,l) + \Gamma_1(i,j))]$$ (defined and hereinafter referred to as "Equation 1")

where $G_1$ is the radar antenna gain, $\lambda$ is wavelength, $\sigma$ is the target radar cross section, $N_P$ is the number of pulses per coherent processing interval (CPI), $L_1$ is the radar system loss, $\tau$ is pulse width, and $\tau \beta_1 > 100$ is the time-bandwidth product for the linear frequency modulated waveform. The variable $$\Gamma_{1(i,j)} = \begin{cases} \theta_j, & i=1, j=1,\ldots,N \\ \Gamma_1(1,j) + \Gamma_1(1,j+1) & i=2, j=1,\ldots,N-1 \\ \Gamma_1(i-1,j) + \Gamma_1(1,i+j-1) & i=3,\ldots N, j=1,\ldots,N-i+1 \end{cases}$$ Equation 2 is the interference and noise power estimate for all contiguous sub-bands in the spectrum produced by the secondary users as seen by the radar. The radar receiver noise factor is defined as $N_{f1}$, but the receiver noise power is inherently estimated in Equation 2 by summing the noise floor for different bandwidth combinations. The interference from the eNodeB to the radar is defined as $$l_{21}(P_2,i,j,j,l) = P_2 G_1 G_2 \psi_{21} / FDR(i,j,k,l)$$ (defined and hereinafter referred to as "Equation 3")

where $G_2$ is the CBS antenna gain, $\Psi_{21}$ is the path loss between the CBS and the radar, and FDR(i, j, k, l) is the Frequency Dependent Rejection (FDR) that measures the interference rejection between the radar and CBS. The FDR offset is based on the co-channel and adjacent channel interference between the two systems. Only co-channel interference is of interest. Note that FDR(i,j,k,l) is dependent on the decision variables, hence more interference occurs when the operating sub-bands of the radar and eNodeB overlap.

The second objective function is the radar range resolution defined as $$\Delta_R = c/[2\beta_1(i)],$$ (defined and hereinafter referred to as "Equation 4")

where c is the speed of light. A small resolution cell size is advantageous for separating closely spaced point targets in range or extracting features from extended targets. Ideally, the radar would occupy $\beta_1(N)=B$ in order to maximize Equation 4, but that decision would decrease Equation 1 (SINR) due to the interference generated by Equation 2 and Equation 3.

The final objective function is the UE capacity modeled as $$Z_3 = \beta_2(k) \log_2[1 + \Phi_3],$$ (defined and hereinafter referred to as "Equation 5")

where $$\Phi_3 = P_2 G_2 G_3 \psi / [L_2(l_{13}(P_1,i,j) + \Gamma(k,l))]$$ (defined and hereinafter referred to as "Equation 6")

is the SINR of the UE 104. $G_3$ is the antenna gain of the UE 104 and $\Psi_{23}$ is the path loss between the CBS 106 and the UE 104. The variable $$\Gamma_{2(k,l)} = \begin{cases} \theta_j, & i=1, j=1,\ldots,N \\ \Gamma_2(1,l) + \Gamma_1(1,l+1) & i=2, j=1,\ldots,N-1 \\ \Gamma_2(k-1,l) + \Gamma_2(1,k+l-1) & i=3,\ldots N, j=1,\ldots,N-i+1 \end{cases}$$ Equation 7 is the interference and noise power estimate for all contiguous sub-bands in the spectrum produced by the secondary RF emitters as seen by the UE 104. The UE noise factor is defined as $N_{f3}$. The interference from the radar to the UE 104 is defined as $$l_{13}(P_1,i,j) = P_1 G_1 G_3 \psi_{13} / [L_1 L_3 \, FDR(i,j,k,l)]$$ (defined and hereinafter referred to as "Equation 8")

where $L_3$ is the UE system loss and $\psi_{13}$ is the path loss between the radar and the UE.

Figure 3:
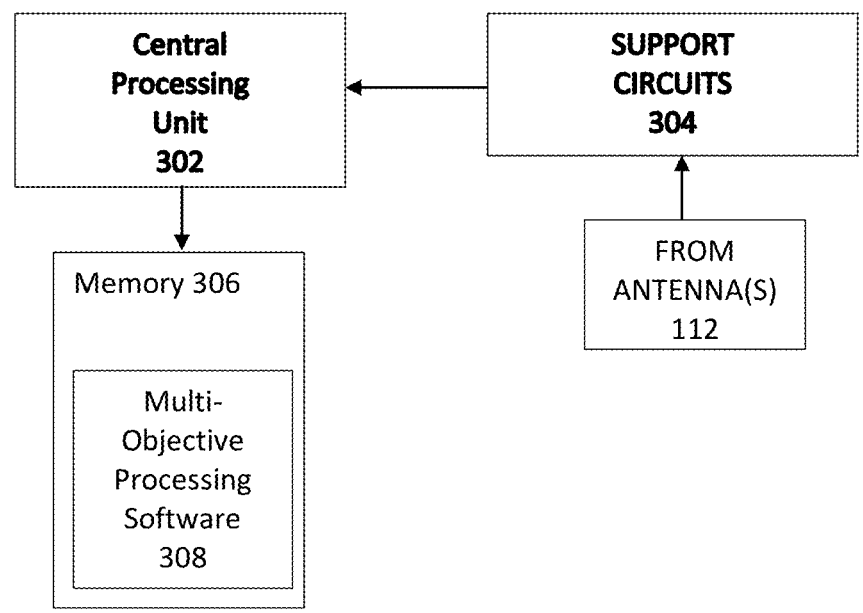
FIG. 3 depicts a block diagram of one embodiment of a spectrum sensing system of FIG. 1.

The goal of the NSGA-II approach is to find the decision vector $x^* = \{x_1^*, x_2^*, x_3^*, x_4^*, x_5^*, x_6^*\}$ that maximizes the objective functions in Equation 1, Equation 4, and Equation 5:

$$Z(x^*) = \{Z_1(x^*), Z_2(x^*), Z_3(x^*)\}$$ (defined and hereinafter referred to as "Equation 9")

in the solution space X subject to the constraints $Z_1(x^*) \geq Z_{1,min}$ and $Z_2(x^*) \leq Z_{2,min}$, and $Z_3(x^*) \leq Z_{3,min}$, where $Z_{1,min}$, $Z_{2,min}$, and $Z_{3,min}$ are the boundary conditions for minimum SINR, bandwidth, and capacity respectively. The solution in Equation 9 is considered feasible if it satisfies these boundary conditions FIG. 3 depicts a block diagram of one embodiment of the spectrum sensing system 110. The system 110 comprises at least one central processing unit (CPU) 302 that is capable of performing the signal processing described above. Such a CPU 302 may include one or more microprocessors, gate arrays, microcontrollers, and the like. Functionality of the CPU is supported by support circuits 304 that may include power supplies, clock circuits, input/output circuit(s), analog to digital converter(s), filters and other well-known support circuits. The support circuits may provide sampling, filtering or other pre-processing of the signals received by the antennas 112. A memory 306 (also referred to as a computer readable medium) stores software 308 that is executed by the CPU 302. The memory may comprise a combination of random access memory, read only memory, removable storage, hard drive storage, solid state storage, and the like. The software 308 specifically comprises multi-objective processing software that, when executed by the CPU 302, performs the multi-objective processing on the signals received by the antennas 112 as described above as well as described below with reference to FIG. 4.

Figure 4:
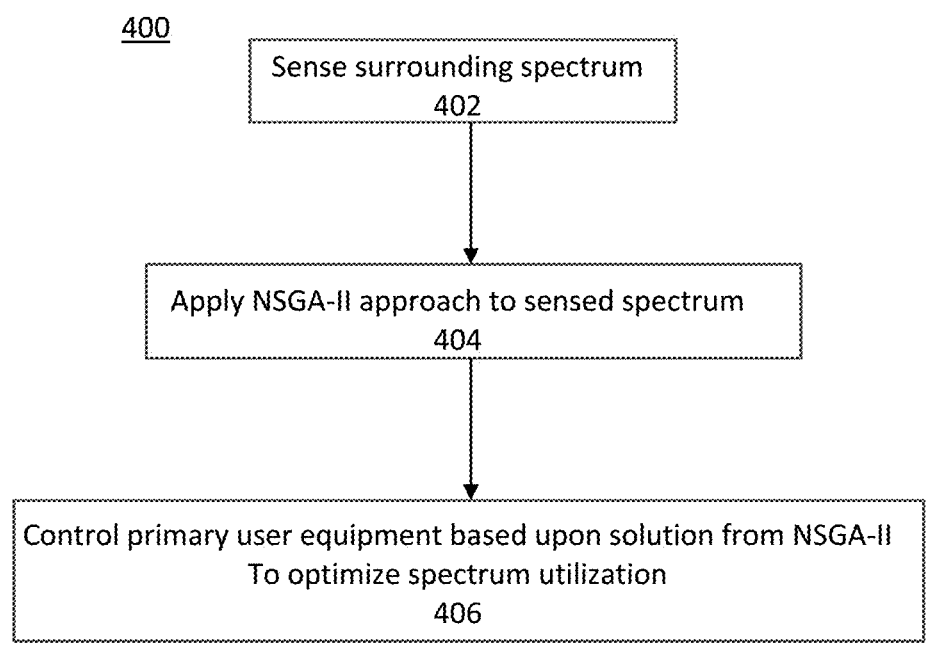
FIG. 4 is a flow diagram of an optimization method used by embodiments of the present invention.

FIG. 4 depicts a flow diagram of a method 400 for optimizing spectrum sharing in accordance with one embodiment of the invention. In one embodiment of the invention, the method 400 is performed in part by executing the software 308 referred to in FIG. 3. The method 400 begins, at step 402, by sensing the surrounding spectrum representing the EME. At step 404, the sensed spectrum is processed as described above using the NSGA-II approach. At step 406, the outcome of the spectrum processing is used to control the primary user equipment such that the utilization of the spectrum is optimized, i.e., primary and secondary users share the spectrum with little impact on performance. Primary user equipment parameters to be controlled include, but are not limited to, transmission power, bandwidth used, frequency allocation for transmission and/or reception, and the like.

Aspects of this invention have been previously disclosed by the inventors in a paper titled "Joint Radar and Communication System Optimization for Spectrum Sharing," which was presented at the 2019 IEEE Radar Conference, Boston Mass., 22-26 Apr. 2019. This paper is herein incorporated by reference in its entirety.

While the foregoing is directed to embodiments of the present invention, other and further embodiments of the invention may be devised without departing from the basic scope thereof, and the scope thereof is determined by the claims that follow.

The invention claimed is:

1. A system for optimizing radio frequency (RF) spectrum sharing comprising:
   a radar system;
   a RF communication system configured to transmit and receive signals to user equipment;
   a spectrum sensing system, coupled to the radar system and the RF communication system, and comprising at least one computer processor configured to sense the RF spectral environment proximate the radar system and the RF communication system, process the sensed RF spectral environment using multi-objective optimization to jointly determine an optimal operational RF spectrum for each of the radar system and the RF communication system and control operational parameters of the radar system and the RF communication system to optimize RF spectrum sharing amongst the radar system and the RF communication system,
   wherein the multi-objective optimization comprises a joint determination of operational frequencies, bandwidths, and power outputs of each of the radar system and the RF communication system together, at the same time, which optimize RF spectrum sharing between them; and
   wherein the multi-objective optimization also takes into account co-channel interference between the radar system users, the RF communication system users, and any other RF systems.

2. The system of claim 1 wherein the processing utilizes multi-objective processing to maximize a first objective function of radar signal to interference plus noise ratio (SINR), a second objective function of radar range resolution, and a third objective function of radio capacity of the user equipment, together, at the same time.

3. The system of claim 2 wherein multi-objective processing is performed using a genetic algorithm.

4. The system of claim 3 wherein the genetic algorithm is performed using a Multi-objective Genetic Algorithm (MOGA), Niched Pareto Genetic Algorithm (NPGA), Weight-based Genetic Algorithm (WBGA), Random Weighted Genetic Algorithm (RWGA), Nondominated Sorting Genetic Algorithm (NSGA), Strength Pareto Evolutionary Algorithm (SPEA), improved SPEA (SPEA2), Pareto-Archived Evolution Strategy (PAES), Pareto Envelope-based Selection Algorithm (PESA), Region-based Selection in Evolutionary Multiobjective Optimization (PESA-II), Fast Nondominated Sorting Genetic Algorithm (NSGA-II), Multi-objective Evolutionary Algorithm (MEA), Micro-GA, Rank-Density Based Genetic Algorithm (RDGA), or Dynamic Multi-objective Evolutionary Algorithm (DMOEA) approach.

5. The system of claim 2, wherein the first objective function of the radar SINR is defined according to Equation 1; the second objective function of the radar range resolution is defined according to Equation 4; and third objective function of the user equipment capacity is defined according to Equation 5.

6. The system of claim 1, wherein the radar system and the RF communication system each comprise primary user equipment.

7. The system of claim 6, wherein the multi-objective optimization of the primary user equipment also takes into account any background RF interference from any secondary user equipment.

8. The system of claim 7, wherein the radar system and the RF communication system have with equal rights to the same shared spectrum.

9. A method of optimizing radio frequency (RF) spectrum sharing between a radar system and a RF communication system configured to transmit and receive RF signals to user equipment, the method comprising:
   sensing a RF spectral environment proximate the radar system and the RF communication system;
   processing the sensed RF spectral environment using multi-objective optimization to jointly determine an optimal operational RF spectrum for each of the radar system and the RF communication system; and
   controlling operational parameters of the radar system and the RF communication system to optimize RF spectrum sharing amongst the radar system and the RF communication system,
   wherein the multi-objective optimization comprises a joint determination of operational frequencies, bandwidths, and power outputs of each of the radar system and the RF communication system together, at the same time, which optimize RF spectrum sharing between them; and
   wherein the multi-objective optimization also takes into account co-channel interference between the radar system users, the RF communication system users, and any other RF systems.

10. The method of claim 9 wherein the processing further comprises multi-objective processing to maximize a first objective function of radar signal to interference plus noise ratio (SINR), a second objective function of radar range resolution, and a third objective function of radio capacity of the user equipment, together, at the same time.

11. The system of claim 10 wherein multi-objective processing comprises executing a genetic algorithm.

12. The system of claim 11 wherein the genetic algorithm is a Multi-objective Genetic Algorithm (MOGA), Niched Pareto Genetic Algorithm (NPGA), Weight-based Genetic Algorithm (WBGA), Random Weighted Genetic Algorithm (RWGA), Nondominated Sorting Genetic Algorithm (NSGA), Strength Pareto Evolutionary Algorithm (SPEA), improved SPEA (SPEA2), Pareto-Archived Evolution Strategy (PAES), Pareto Envelope-based Selection Algorithm (PESA), Region-based Selection in Evolutionary Multiobjective Optimization (PESA-II), Fast Nondominated Sorting Genetic Algorithm (NSGA-II), Multi-objective Evolutionary Algorithm (MEA), Micro-GA, Rank-Density Based Genetic Algorithm (RDGA), or Dynamic Multi-objective Evolutionary Algorithm (DMOEA) approach.

13. The method of claim 10, wherein the first objective function of the radar SINR is defined according to Equation 1; the second objective function of the radar range resolution is defined according to Equation 4; and third objective function of the user equipment capacity is defined according to Equation 5.

14. The method of claim 9, wherein the radar system and the RF communication system each comprise primary user equipment.

15. The method of claim 14, wherein the multi-objective optimization of the primary user equipment also takes into account any background RF interference from any secondary RF user equipment.

16. A non-transitory computer readable medium having software instructions that, when executed by at least one computer processor, perform a method of optimizing radio frequency (RF) spectrum sharing between a radar system and a RF communication system which is configured to transmit and receive RF signals to user equipment, the method comprising:
- sensing a RF spectral environment proximate the radar system and the RF communication system;
- processing the sensed RF spectral environment using multi-objective optimization to jointly determine an optimal operational RF spectrum for each of the radar system and the RF communication system; and
- controlling operational parameters of the radar system and the RF communication system to optimize RF spectrum sharing amongst the radar system and the RF communication system,
- wherein the multi-objective optimization comprises a joint determination of operational frequencies, bandwidths, and power outputs of each of the radar system and the RF communication system together, at the same time, which optimize RF spectrum sharing between them; and
- wherein the multi-objective optimization also takes into account co-channel interference between the radar system users, the RF communication system users, and any other RF systems.

17. The method of claim 16 wherein the processing further comprises multi-objective processing to maximize a first objective function of radar signal to interference plus noise ratio (SINR), a second objective function of radar range resolution, and a third objective function of radio capacity of the user equipment, together, at the same time.

18. The method of claim 17 wherein multi-objective processing comprises executing a genetic algorithm.

19. The method of claim 18 wherein the genetic algorithm is Multi-objective Genetic Algorithm (MOGA), Niched Pareto Genetic Algorithm (NPGA), Weight-based Genetic Algorithm (WBGA), Random Weighted Genetic Algorithm (RWGA), Nondominated Sorting Genetic Algorithm (NSGA), Strength Pareto Evolutionary Algorithm (SPEA), improved SPEA (SPEA2), Pareto-Archived Evolution Strategy (PAES), Pareto Envelope-based Selection Algorithm (PESA), Region-based Selection in Evolutionary Multiobjective Optimization (PESA-II), Fast Nondominated Sorting Genetic Algorithm (NSGA-II), Multi-objective Evolutionary Algorithm (MEA), Micro-GA, Rank-Density Based Genetic Algorithm (RDGA), or Dynamic Multi-objective Evolutionary Algorithm (DMOEA) approach.

20. The method of claim 17, wherein the first objective function of the radar SINR is defined according to Equation 1; the second objective function of the radar range resolution is defined according to Equation 4; and third objective function of the user equipment capacity is defined according to Equation 5.

21. The method of claim 16 wherein controlling the operational parameters comprises modifying the center frequencies, bandwidths and output powers of each of the radar system and the RF communication system.

22. The method of claim 16, wherein the radar system and the RF communication system each comprise primary user equipment.

23. The method of claim 22, wherein the multi-objective optimization of the primary user equipment also takes into account any background RF interference from any secondary RF user equipment.

* * * * *